(12) United States Patent
Lee et al.

(10) Patent No.: US 11,636,717 B2
(45) Date of Patent: Apr. 25, 2023

(54) ALLOPHONE INSPECTION DEVICE AND INSPECTION METHOD THEREOF

(71) Applicants: HYUNDAI MOTOR COMPANY, Seoul (KR); KIA MOTORS CORPORATION, Seoul (KR); Seoul National University R&DB Foundation, Seoul (KR)

(72) Inventors: Sung Wook Lee, Seoul (KR); Seong-Cheol Kim, Seoul (KR); Joo Hyun Park, Seoul (KR); Byeong-Ho Lee, Seoul (KR); Wanjei Cho, Seoul (KR)

(73) Assignees: HYUNDAI MOTOR COMPANY, Seoul (KR); KIA MOTORS CORPORATION, Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 311 days.

(21) Appl. No.: 17/088,367

(22) Filed: Nov. 3, 2020

(65) Prior Publication Data

US 2021/0327174 A1    Oct. 21, 2021

(30) Foreign Application Priority Data

Apr. 21, 2020   (KR) .......................... 10-2020-0048081

(51) Int. Cl.
*G07C 5/08*    (2006.01)
*G07C 5/00*    (2006.01)
*H04R 3/00*    (2006.01)

(52) U.S. Cl.
CPC .......... *G07C 5/0833* (2013.01); *G07C 5/008* (2013.01); *G07C 5/0808* (2013.01); *H04R 3/005* (2013.01)

(58) Field of Classification Search
CPC .... G07C 5/0833; G07C 5/008; G07C 5/0808; H04R 3/005; H04R 2430/21; G01M 7/00;
(Continued)

(56) References Cited

U.S. PATENT DOCUMENTS

2017/0337938 A1* 11/2017 Kim ....................... H04R 1/406
2019/0348057 A1* 11/2019 Schloss .............. B62D 33/0604
2021/0327174 A1* 10/2021 Lee ...................... G07C 5/0808

FOREIGN PATENT DOCUMENTS

DE    102020214847 A1 * 10/2021 ............... G01H 3/00
KR       2014073230 A  *  6/2014 ............... B60J 3/00
(Continued)

OTHER PUBLICATIONS

English translation of WO-2018163810-A1.*

*Primary Examiner* — Joseph J Dallo
(74) *Attorney, Agent, or Firm* — McDonnell Boehnen Hulbert & Berghoff LLP

(57) ABSTRACT

An allophone inspection device and inspection method thereof are provided. An allophone inspection device includes an array microphone unit in which a plurality of array microphones are disposed at predetermined intervals, and a controller configured to build reference data by quantifying analyzed allophone by collecting sound signals generated from surrounding based on a position where the array microphone unit is installed in advance and measure a surrounding sound signal through the array microphone unit to estimate whether or not noise is generated and a position of the sound source where the noise is generated based on the reference data.

16 Claims, 11 Drawing Sheets

(58) Field of Classification Search
CPC ..... G01M 17/007; G01N 29/04; G01N 29/14; G01H 3/00
See application file for complete search history.

(56) References Cited

FOREIGN PATENT DOCUMENTS

| | | | | | |
|---|---|---|---|---|---|
| KR | 1793645 | B1 | * | 11/2017 | ............... B60N 2/58 |
| KR | 2018036817 | A | * | 4/2018 | ............. B25B 11/02 |
| WO | WO-2018163810 | A1 | * | 9/2018 | ........... G10K 11/178 |
| WO | WO-2021250765 | A1 | * | 12/2021 | |

* cited by examiner

FIG. 5
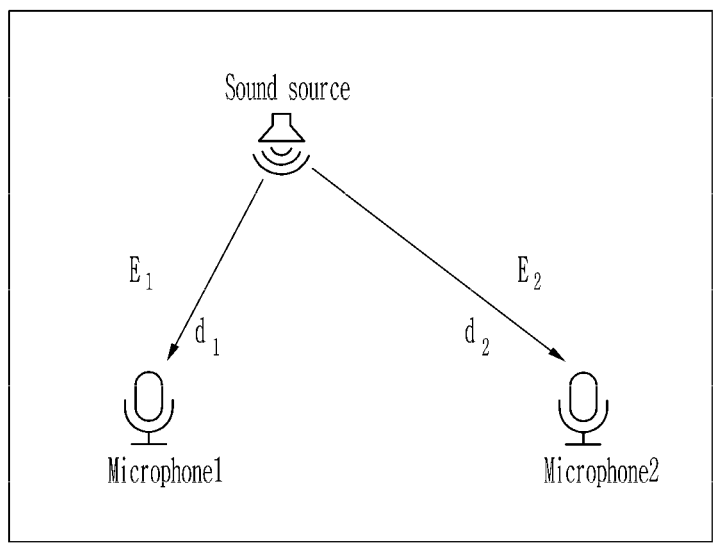
(A) Conceptual diagram of sound source position estimation based on ILD
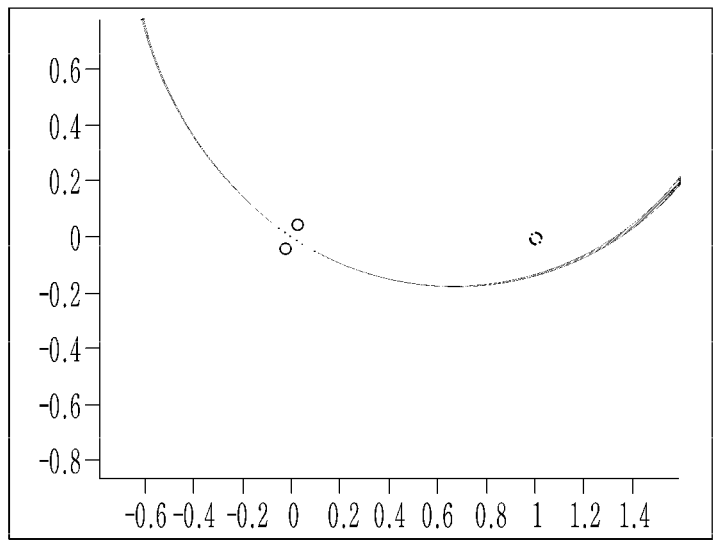
(B) Result of sound source position estimation based on ILD

FIG. 6
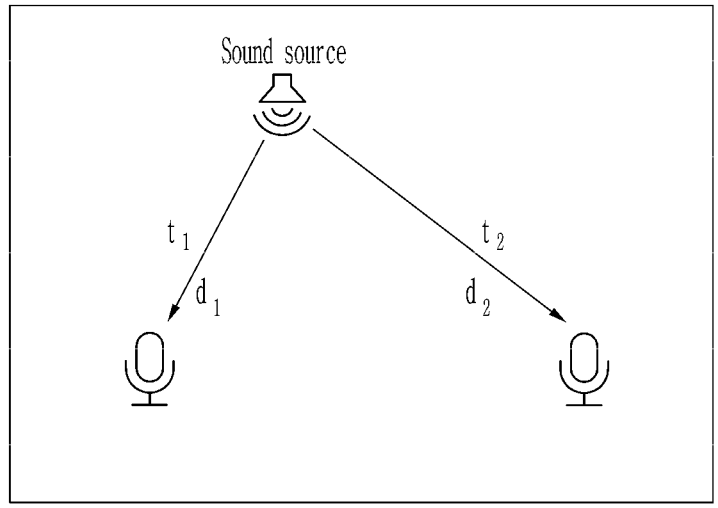
(A) Conceptual diagram of sound source position estimation based on TDoA
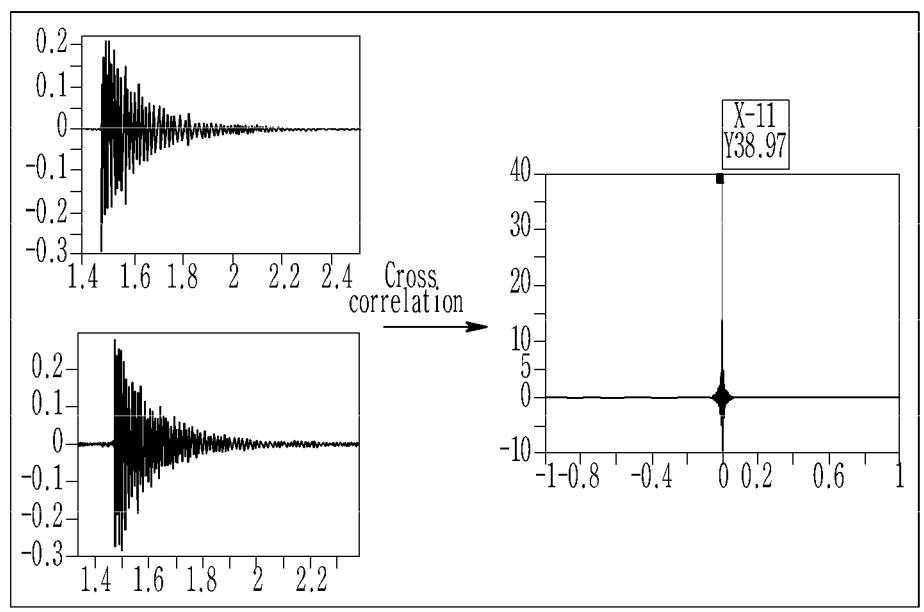
(B) Cross correlation for obtaining difference in arrival time

ALLOPHONE INSPECTION DEVICE AND INSPECTION METHOD THEREOF

CROSS-REFERENCE TO RELATED APPLICATION

This application claims priority to and the benefit of Korean Patent Application No. 10-2020-0048081 filed in the Korean Intellectual Property Office on Apr. 21, 2020, the entire contents of which are incorporated herein by reference.

TECHNICAL FIELD

The present disclosure relates to an allophone inspection device and inspection method thereof. More particularly, the present disclosure relates to an allophone inspection device and inspection method thereof for detecting an allophone based on a sound signal received from a vehicle while driving or a production line of a vehicle factory, and estimating a position where the noise is generated.

BACKGROUND

In general, various facilities of machinery are operated on the production line of a vehicle factory, and allophone having a discriminating power is generated with a unique sound according to the operation of each facility. At this time, since the allophone (sound) generated during normal operation of each facility and the noise generated during abnormal operation are distinguished, it is possible to predict whether the facility is abnormal through the determination.

In addition, due to the characteristics of a vehicle driving on a road by driving various mechanical devices and components such as a drive system, it is inevitable to generate an engine sound, a driving system vibration sound, and a wind noise. On the other hand, the quietness of the vehicle is acting as an important factor for customers to select a product.

Therefore, the vehicle factory conducts a vehicle driving inspection to grasp the noise generated for various reasons from the sound generated during the driving of the completed vehicle. This is a final inspection for noise generation due to various reasons such as defective assembly or malfunction of the device because the vehicle is a product in which various parts and mechanical devices are assembled.

For example, conventional vehicle driving inspection roughly estimates whether or not allophone/noise is generated through both ears while an operator drives a vehicle and its position. However, the conventional inspection method has a problem in that the reliability of the driving inspection quality is degraded by inducing a human error by determining allophone/noise based on an atypical criterion that depends on the emotions of workers with different skill levels.

In addition, conventionally, a method of measuring which part of the allophone/noise is generated by installing a plurality of microphones at each part of a drive system (eg, a drive shaft) connected to a mechanical device such as an engine has been studied.

However, this method has a disadvantage in that the work man-hour and working time are excessively generated because the microphone must be individually set at various measurement parts of the corresponding mechanical device, and then the sound must be measured and collected again after the measurement is completed. For this reason, there is a problem that is practically impossible to apply in vehicle factories where vehicles are continuously produced. In addition, when the microphone is set for each vehicle, a position error of the microphone may occur. This has a problem in that the measurement reliability is degraded due to a human error that the sound measurement conditions change every time.

The above information disclosed in this Background section is only for enhancement of understanding of the background of the disclosure, and therefore it may contain information that does not form the prior art that is already known in this country to a person of ordinary skill in the art.

SUMMARY

The present disclosure provides an allophone inspection device and inspection method thereof generating standardized reference data through visualization and quantification by collecting the sound generated during the operation of the vehicle or process line by arranging multiple array microphones and estimating the occurrence of noise and the position of the sound source based on the reference data.

According to an exemplary embodiment of the present disclosure, an allophone inspection device includes an array microphone unit in which a plurality of array microphones are disposed at predetermined intervals, and a controller configured to build standardized reference data by quantifying analyzed allophone by collecting sound signals generated from the surroundings based on the position where the array microphone unit is installed in advance and measure a surrounding sound signal through the array microphone unit to estimate whether or not noise is generated and a position of the sound source where the noise is generated based on the reference data.

Here, the allophone inspection device may further include a sound collection unit collecting sound signals received from each microphone when the array microphone unit is operated, a filter unit that models and stores a noise signal collected in the installed position or inspection environment in advance, and filters the noise signal from the received sound signal, a communication unit that communicates with MES (Manufacturing Execution System) or in-vehicle wireless OBD, a display unit providing a user input menu (UI) for allophone inspection, a memory for storing the reference data and result data according to the allophone inspection, and a main body in which the each part is mounted or built in.

Further, the communication unit may acquire vehicle type and option information through connection with the wireless OBD, set reference data matched thereto, and when the allophone inspection is completed, match the vehicle ID with the inspection result data and transmits it to the MES.

Further, the sound collection unit may classify the sound signals received from the signal lines connected to each microphone arranged in the plurality of array microphones by microphone ID.

Further, the array microphone unit may be modularized in a form in which a first array microphone and a second array microphone in which six microphones are arranged in a hexagonal shape are installed in a straight line on a plane of the main body.

Further, the controller may determine an allophone based on sound signals received from the first array microphone and the second array microphone, and estimate the position of a sound source existing on the half plane based on the straight line.

Further, the main body may include a plurality of mounts disposed at regular intervals on both sides of the horizontal upper surface to each of which the first array microphone and the second array microphone are coupled, and a mounting portion detachably coupled to the vehicle on the lower surface.

Further, the mounting portion may be provided with wings on both sides that are respectively inserted between sunshields for driver and passenger seats or with a suction plate attached to the vehicle's windshield.

Further, the controller may generate a 3D sound map (MAP) divided into a plurality of sound field regions by analyzing sound signals generated according to the installation environment of a factory line or a vehicle in advance, quantifying the normally generated allophone and the position of the sound source.

Further, the controller may generate the standardized reference data by digitizing a normal sound pattern and a sound source position generated from a sound source existing for each sound field region.

Further, the reference data may be generated for each process line where allophone inspection is performed, for each vehicle type, and for each vehicle with multiple options.

Further, the controller may analyze the sound signal received in real time and generate a noise event when an unspecified noise not defined in the reference data is detected, or generate a noise event when even the defined noise exceeds a predetermined noise reference level.

Further, the controller may select a weight according to the reliability of the result of a sound source estimation algorithm combining an interaural level difference (ILD) method and a time difference of arrival (TDoA) method, and estimate the sound source position where the noise event occurs based on the minimum distance of the measured result values for each microphone pair.

Meanwhile, according to an exemplary embodiment of the present disclosure, a method for inspecting a driving state of a vehicle by an allophone inspection device in which a plurality of array microphones are disposed at a predetermined interval includes a) analyzing allophone by collecting sound signals for each vehicle type and multiple option vehicles in advance, and generating standardized reference data by quantifying through visualization and quantification, b) collecting sound signals while the vehicle is driving through the first array microphone and the second array microphone arranged at regular intervals, c) analyzing each sound signal received for each microphone pair configured in the first array microphone and the second array microphone to determine allophone pattern of the sound signal for each sound field region, and d) generating a noise event and estimating a position of a sound source where noise is generated when an unspecified allophone pattern not defined in the reference data is detected.

Further, between the a) step and b) step, the method for inspecting a driving state of a vehicle may further include setting the reference data corresponding to the vehicle ID obtained through connection with the wireless OBD of the vehicle when the allophone inspection device is mounted on the vehicle.

Further, the b) step may include classifying a received sound signal according to each microphone ID installed in the first array microphone and the second array microphone, and filtering a noise signal modeled in the reference data from the sound signal.

Further, in the d) step, the noise event may occur when the power of the sound signal exceeds a certain noise reference level in the state that the allophone pattern of the sound signal is determined to be a defined allophone.

Further, the estimating a position of a sound source may include d-1) selecting a corresponding sound field region based on a correlation characteristic between sound signals received by the first array microphone and the second array microphone, d-2) obtaining a result value including one or more estimated points and distances according to a sound pressure intensity difference (ILD) and arrival time difference (TDoA) algorithm for each microphone pair through the sound signal received in the selected sound field region, d-3) applying a weight according to the reliability of a result of a sound source estimation algorithm combining the ILD and TDoA corresponding to the selected sound field region to the result value of each microphone pair, and d-4) estimating an estimated point having a minimum distance among the weighted result values for each microphone pair as a noise source position.

Further, the sound source estimation algorithm may calculate the estimated point for each microphone pair using the following Equation 1 when the signal received from microphone i is called si(t) and $\vec{x}_i$ is the position of microphone. Here, $P(\vec{x})$ is cost function, $\hat{x}_{estimate} = \arg\min\{P(\vec{x}_i)\}$, $\tau_{mn}$ is difference in arrival time between microphone m and microphone n, v is the speed of sound in the current environment, $w_{ij}(\vec{x})$ is weight value based on sound pressure difference, and, $w_{mn}'$ is weight value based on difference in arrival time.

Further, after the d) step, the method for inspecting a driving state of a vehicle may further include displaying the estimated noise source position on a display unit, and matching the position of the noise event and the noise source with the vehicle ID, storing it in a memory, and transmitting it to a Manufacturing Execution System (MES).

According to an exemplary embodiment of the present disclosure, it is possible to prevent a human error dependent on an operator during a driving inspection of a conventional vehicle and improve measurement reliability by generating reference data suitable for the installation environment of the vehicle through an allophone inspection device in which a plurality of array microphones are modularly arranged and based on this, determining whether the received sound signal is a normal sound.

Further, it is possible to improve the sound source position estimation performance in an environment in which reverberation and noise exist by estimating the position of the sound source by selecting an appropriate weight for each microphone pair according to the installation environment of the allophone inspection device.

Further, the accuracy of sound source position estimation can be improved by obtaining the position of the sound source for each microphone pair through a sound source position estimation algorithm that combines the sound pressure intensity difference (ILD)-based technique and the arrival time difference (TDoA)-based technique and by estimating the position of the sound source based on the minimum distance.

DRAWINGS

FIG. 5 shows an experiment for estimating a sound source position based on a sound pressure intensity difference (ILD) in one form of the present disclosure and a result thereof.

FIG. 6 shows an experiment for estimating a sound source position based on a difference in arrival time (TDoA) in one form of the present disclosure and a result thereof.

DESCRIPTION OF SYMBOLS

Figure 1:
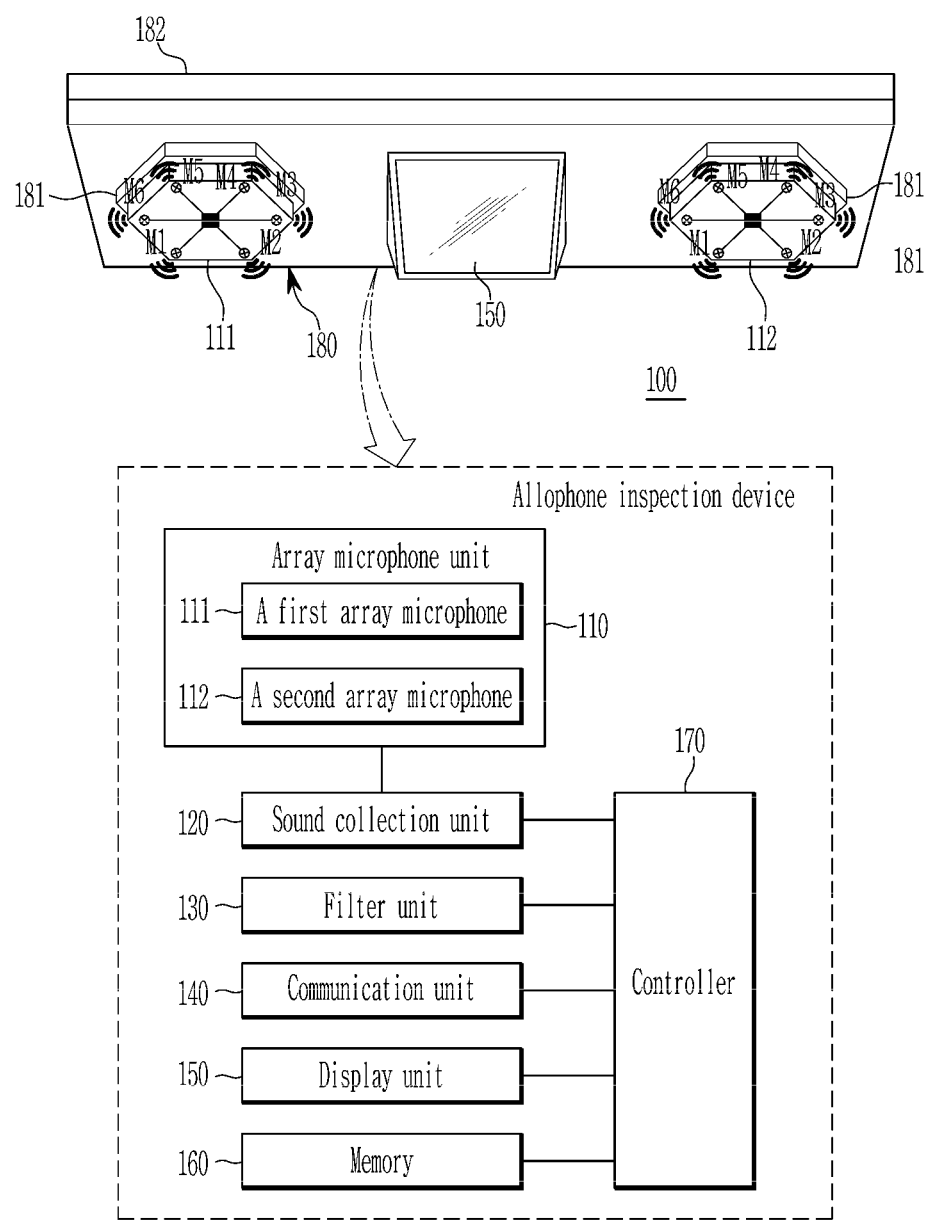
FIG. 1 is a block diagram schematically showing the configuration of an allophone inspection device in one form of the present disclosure.

100: allophone inspection device 110: array microphone unit
111: first array microphone 112: second array microphone
120: sound collection unit 130: filter unit
140: communication unit 150: display unit
160: memory 170: controller
180: main body 181: mount
182: mounting unit 182a, 182b: wings on both sides

DETAILED DESCRIPTION

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements. In addition, the terms "-er", "-or", and "module" described in the specification mean units for processing at least one function and operation, and can be implemented by hardware components or software components, and combinations thereof.

Throughout the specification, terms such as first, second, 'A', 'B', '(a)', '(b)', and the like will be used only to describe various elements, and are not to be interpreted as limiting these elements. These terms are only for distinguishing the constituent elements from other constituent elements, and nature or order of the constituent elements is not limited by the term.

It will be understood that when an element is referred to as being "connected," or "coupled," to another element throughout the specification, it can be directly connected or coupled to the other element or intervening elements may be present. In contrast, when an element is referred to as being "directly connected," or "directly coupled," to another element, there are no intervening elements present.

an allophone inspection device and inspection method thereof according to an exemplary embodiment of the present disclosure will now be described in detail with reference to the drawings FIG. 1 is a block diagram schematically showing the configuration of an allophone inspection device according to an exemplary embodiment of the present disclosure.

Figure 2:
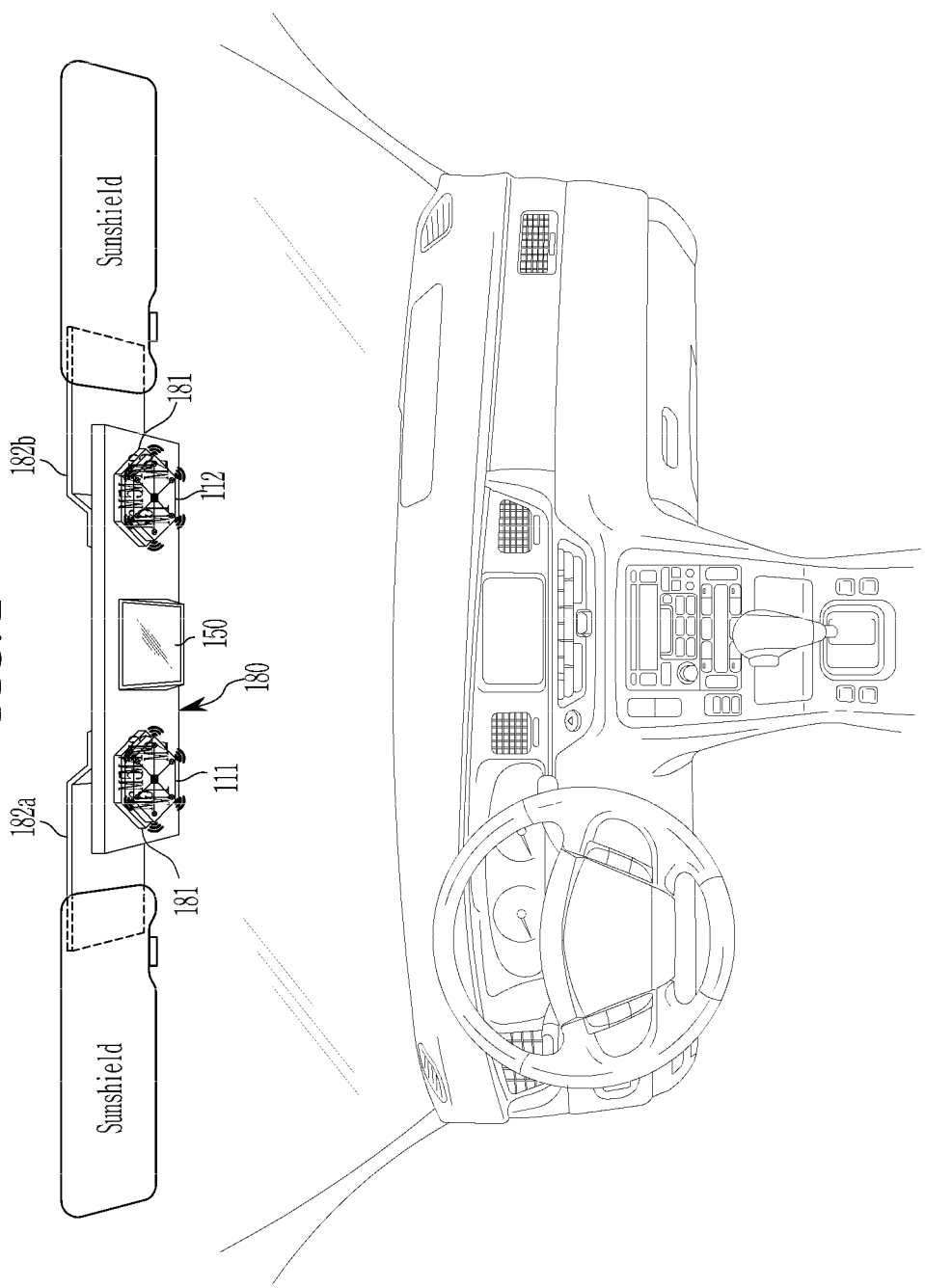
FIG. 2 is a conceptual diagram showing a state in which an allophone inspection device is installed for vehicle driving inspection in one form of the present disclosure.

FIG. 2 is a conceptual diagram showing a state in which an allophone inspection device is installed for vehicle driving inspection according to an exemplary embodiment of the present disclosure.

Figure 3:
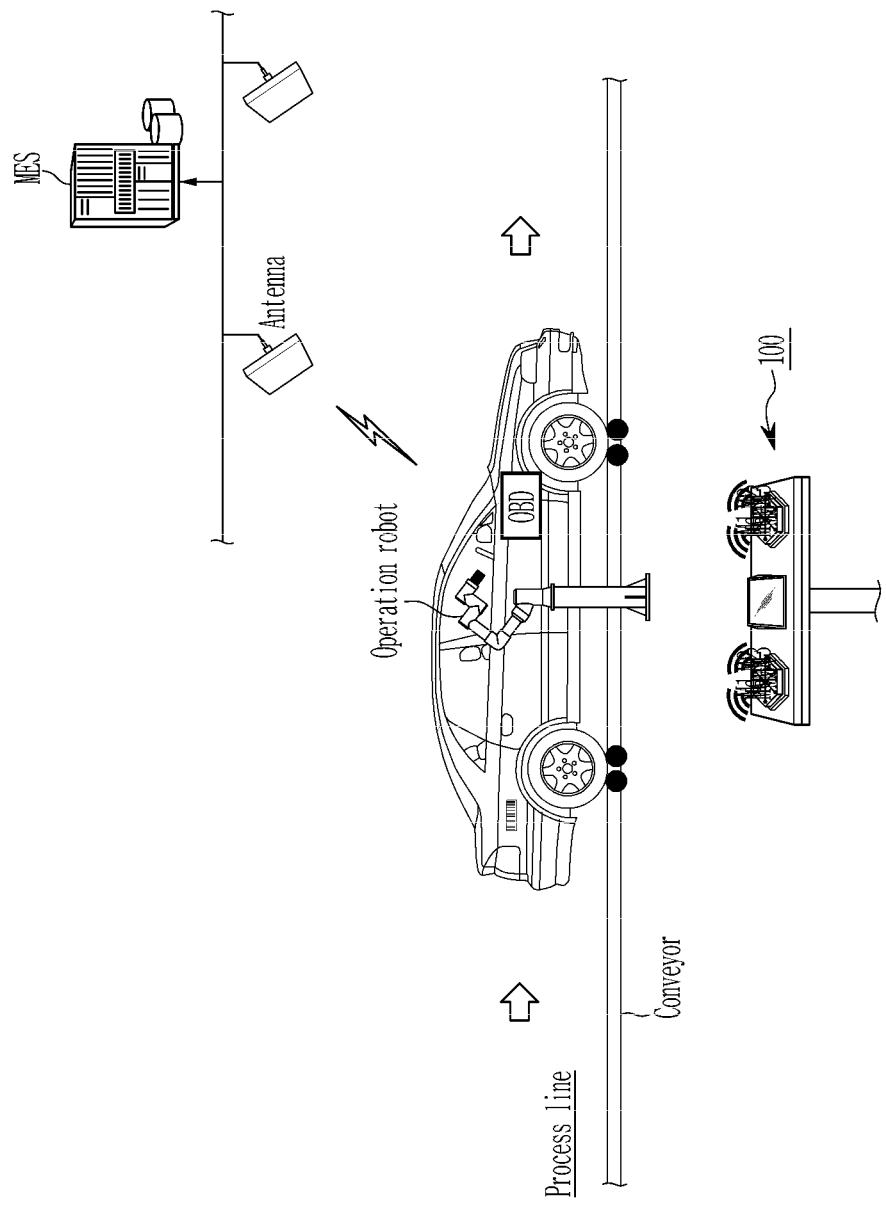
FIG. 3 is a conceptual diagram showing a state in which an allophone inspection device is installed in a process line in one form of the present disclosure.

FIG. 3 is a conceptual diagram showing a state in which an allophone inspection device is installed in a process line according to an exemplary embodiment of the present disclosure.

Referring to FIG. 1 to FIG. 3, an allophone inspection device 100 according to an exemplary embodiment of the present disclosure includes an array microphone unit 110, a sound collection unit 120, a filter unit 130, a communication unit 140, a display unit 150, a memory 160, and a controller 170. Each part may be mounted on or built into the main body 180 to be manufactured in the form of an allophone inspection terminal or kit that the operator can carry.

The allophone inspection device 100 may be temporarily disposed on a vehicle that has been assembled in a vehicle factory as in the embodiment of FIG. 2 to detect allophone/noise according to the driving of the vehicle, and the allophone inspection device 100 may be disposed on a process line as in the embodiment of FIG. 3 to detect allophone/noise generated in a facility.

At this time, the allophone inspection device 100 collects sound signals generated around the installed environment (position) to analyze the allophone, and through this, the quantified data is visualized and quantified to generate standardized reference data. In addition, the allophone inspection device 100 is characterized in that it estimates whether noise is generated or a position of the sound source based on the reference data.

Hereinafter, throughout the specification, a sound source such as a specific part or machinery device operated in a vehicle or in a process line according to the installed environment (position) of the allophone inspection device 100, or a standardized sound source generated in a region where the sound source is located. This is called 'normal sound'. In addition, if an undefined allophone (sound) or a defined allophone exceeds a certain noise reference level based on the reference data defined by the standardization, it is referred to as 'noise'.

The reference data may be applied by constructing standardized data for each process line, multi-vehicle, and multi-option vehicle on which allophone inspection is performed.

The array microphone unit 110 includes a first array microphone 111 and a second array microphone 112.

Each of the first array microphone 111 and the second array microphone 112 has six microphones M1 to M6 arranged in a hexagonal shape at each vertex of a regular hexagonal substrate. In addition, the two array microphones are modularized in a straight line installed on a plane. At this time, the distance between the microphones of the array microphone is 5 cm, and the functions of Direction of Arrival (DoA), Beam-Forming (BF), and Acoustic Echo Cancellation (AEC) may be applied.

The first array microphone 111 and the second array microphone 112 are fixedly mounted at regular intervals by a mount 181 formed on the upper surface of the parallel body 180, and estimate the position of the sound source existing on the half plane from the mounted position. Hereinafter, the estimation of the position of the sound source has the same meaning as tracking the position of the sound source and the type of the device/equipment.

It is very important to generate standardized reference data by measuring a quantitative sound signal under the same position and environmental conditions, and to perform allophone inspection under the same environmental conditions in order to detect the occurrence of noise in the environment in which the allophone inspection device 100 is installed and further estimate the position of the sound source where the allophone is generated.

The main body 180 includes a plurality of mounts 181 disposed at regular intervals on both sides of a horizontal upper surface to each of which an array microphone is coupled, and a mounting portion 182 detachably coupled to a lower portion thereof. Here, the mounting portion 182 is provided to enable the allophone inspection device 100 to be installed in the same environmental conditions at all times corresponding to multiple vehicle types.

For example, referring to FIG. 2, the mounting part 182 may be provided with both wings 182a and 182b inserted between the driver's seat and the auxiliary seat's sunlight shield in consideration of the allophone measurement direction. Further, the present disclosure is not limited thereto, and the mounting portion 182 may be provided as an adsorption plate (not shown) so as to be attached to a designated position on the windshield of the vehicle. Therefore, it is always installed at the allophone inspection position under the same environmental condition, so that the operator's installation convenience and measurement errors of the allophone can be prevented.

IDs are assigned to the first array microphone 111 and the second array microphone 112 according to the position where each microphone M1 to M6 is disposed, and the signal lines of each of the microphones M1 to M6 are connected to the sound collection unit 120. In this case, the microphones M1 to M6 may be configured as high-sensitivity microphones (Micro-Electro-Mechanical Systems, MEMS) that convert sound signals into electrical signals.

The sound collection unit 120 collects sound signals received from each microphone when the array microphone unit 110 is operated.

The sound collection unit 120 may classify the sound signals received from the signal lines connected to the microphones M1 to M6 of the first array microphone 111 and the second array microphone 112 by microphone ID.

The filter unit 130 models and stores a noise signal that may be collected in a position or an inspection environment where the allophone inspection device 100 is installed in advance, and filters the noise signal from the received sound signal. For example, since ambient noise such as reverberation generated during a process line or vehicle driving inspection, voice of a worker, or coughing sound can be generated at any time, it can be saved as a noise model and filtered. Therefore, it is possible to prevent the detection event of unnecessary noise due to ambient noise.

The communication unit 140 communicates with a Manufacturing Execution System (MES) that manages the operation of the allophone inspection device 100 through a wireless communication means as shown in FIG. 3 to transmit and receive data for allophone inspection under the installed environmental conditions. Here, the MES manages the operation state of the allophone inspection device 100 and the arrangement for each terminal ID, and the MES transmits reference data for allophone inspection for each process line or multi-vehicle and multi-option vehicle to which each allophone inspection device 100 is applied. In addition, the MES may update the reference data of the allophone inspection device 100 when a facility (device) is added to the installation environment or is changed when a device is replaced.

The communication unit 140 may communicate with the MES through a wireless antenna disposed on the process line, or, in the case of driving inspection, communicate with the MES through connection with a wireless OBD mounted in the vehicle. In this case, the communication unit 140 may acquire vehicle type and option (specification) information through connection with the wireless OBD and set reference data matched thereto.

In addition, the communication unit 140 may automatically input the start and end of the allophone inspecton of the vehicle by transmitting an ON/OFF signal of the vehicle received through the wireless OBD to the controller 170.

In addition, when the allophone inspection is completed, the communication unit 140 may match the vehicle ID with the inspection result data and transmit it to the MES.

The display unit 150 is configured with a touch screen to provide an operator input menu (UI) for allophone inspection. In addition, information generated according to the operation of the allophone inspection device 100 and inspection results may be visually displayed so that an operator can check them.

The memory 160 stores various programs and data for operation of the allophone inspection device 100 and stores data generated according to the operation.

For example, the memory 160 may store reference data for allophone inspection for each process line or multi-option vehicle, and may store result data according to the allophone inspection.

The controller 170 includes at least one processor for operating the allophone inspection device 100 according to an exemplary embodiment of the present disclosure, and controls the operation of each part for the allophone inspection.

The controller 170 determines allophone based on the sound signals received from the first array microphone 111 and the second array microphone 112 installed in a straight line on a plane, and estimates the position of the sound source on the half-plane based on the straight line.

In particular, the controller 170 selects a weight according to the reliability of the result of the sound source estimation algorithm combining an interaural level difference (ILD) method and a time difference of arrival (TDoA) method. Then, the sound source position is estimated based on the minimum distance of the result values measured for each microphone pair.

Hereinafter, the sound source estimation algorithm of the controller 170 will be described in detail.

The controller 170 analyzes the received sound signals for each microphone ID of the first array microphone 111 and the second array microphone 112 by collecting sound signals generated from the surroundings over time as the allophone inspection is started.

The controller 170 determines allophone by using at least one of the analyzed frequency of the acoustic signal, the sound pressure intensity difference (ILD), the arrival time difference (TDoA), and the steering response power (SRP). Then, the controller 170 estimates the sound source position of the allophone.

At this time, the controller 170 may determine the sound source position and the allophone normally generated by analyzing the sound generated according to the installation environment inside the factory line or the vehicle in advance to estimate the sound source position. In addition, a 3D sound map (MAP) divided into a plurality of sound field regions may be generated by quantifying the allophone and sound source positions.

Figure 4:
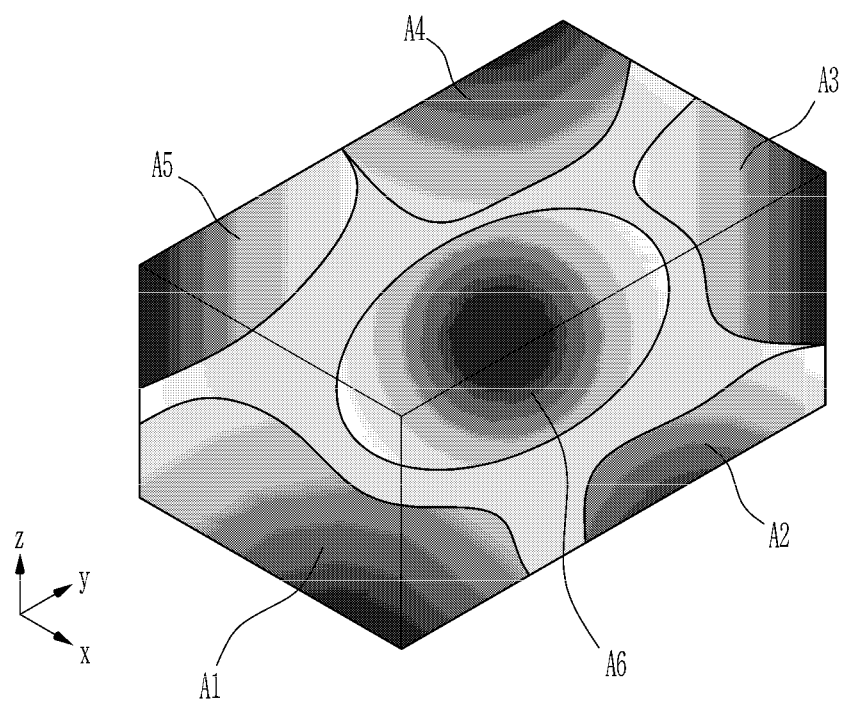
FIG. 4 shows an example of a 3D sound map in one form of the present disclosure.

For example, FIG. 4 shows an example of a 3D sound map according to an exemplary embodiment of the present disclosure.

Referring to FIG. 4, a state in which the sound signals generated around the environment in which the allophone inspection device 100 is installed according to an exemplary embodiment of the present disclosure is collected and the allophone is analyzed and quantified data is visualized as a 3D sound map (MAP).

The 3D acoustic map MAP includes one or more sound field regions A1 to A6 obtained by estimating and grouping the position of a sound source of allophone detected around an environment in which the allophone inspection device 100 is installed. For example, in the case of a vehicle, the sound field region is classified by grouping various patterns of allophone generated from sound sources such as engines, transmissions, exhaust flows, air conditioners, and wheels. Various patterns of allophone normally generated by one or more mechanical parts and devices belonging to each class may exist in the sound field region.

The controller 170 generates standardized reference data by digitizing the normal sound pattern generated from the sound source and the sound source position measured through an experiment with reference to sound source information existing for each sound field region.

The controller 170 stores the reference data in the memory 160, analyzes the sound signal received in real time, and generates a noise event when an unspecified noise is detected based on the reference data defined as standardization. The present disclosure is not limited thereto, and the controller 170 may generate a noise event when the received sound signal exceeds a predetermined noise reference level even if the sound signal is defined above.

When the noise event occurs, the controller 170 estimates the position of the sound source at which the unspecified noise (ie, noise) is generated, and displays it through the display unit 150. In addition, the allophone inspection result may be matched to the process line ID or vehicle ID, stored in the memory 160, and transmitted to the MES through the communication unit 140.

Due to the characteristics of the allophone inspection device 100 used in an environment with a lot of noise or reverberation, it is very important not only to detect a noise event but also to estimate the position of a sound source that is the cause of the noise in order to secure allophone inspection performance and reliability.

Therefore, the principle of estimating the position of a sound source robustly improved against reverberation according to an exemplary embodiment of the present disclosure will be described in more detail.

The sound pressure intensity difference (ILD), the arrival time difference (TDoA), and steering response power (SRP) may be used as a method of estimating the position of a sound source where sound is generated.

For example, FIG. 5 shows an experiment for estimating a sound source position based on a sound pressure intensity difference (ILD) according to an exemplary embodiment of the present disclosure and a result thereof.

Referring to FIG. 5, ILD shows the result of measuring the sound signals coming into two microphones from a sound source in order to apply the difference in energy level of sound coming in on both sides of a person to the position estimation technique.

This is similar to a position estimation technique using a received signal strength (RSS) of wireless communication, and can be expressed as Equation 1 below.

$$E_i = \int_0^T \left[\frac{s^2(t)}{d_i^2} + n_i^2(t)\right]dt = \frac{1}{d_i^2}\int_0^T s^2(t)dt + \int_0^T n_i^2(t)dt \quad \text{(Equation 1)}$$

$$E_1 d_1^2 = E_2 d_2^2 + \int_0^T [n_2^2(t) - n_1^2(t)]dt$$

(Here, Ei is energy, s(t) is signal, n(t) is noise, and d is distance.)

If the last term of Equation 1 above is ignored, the distance between each microphone and the sound source can be obtained as, $E_1 d_1^2 = E_2 d_2^2$, and the position of the sound source can be estimated by triangulation.

However, in the ILD method, the microphone is vulnerable to a change in Signal to Noise Ratio (SNR), and thus has a disadvantage of showing low accuracy in an acoustic reverberation environment. In addition, there is a disadvantage in that the recording sampling rate is large and the accuracy of the randomly generated sound is poor.

Meanwhile, FIG. 6 shows an experiment for estimating a sound source position based on a difference in arrival time (TDoA) according to an exemplary embodiment of the present disclosure and a result thereof.

Referring to FIG. 6, The TDoA method shows a method of estimating the position of the sound source by obtaining the difference in arrival time due to the distance between the target sound source and the two microphones arranged.

The difference in arrival time can be obtained by using cross correlation between two sound signals received from each microphone.

For example, the difference in arrival time may be detected by obtaining a point at which the peak rises by obtaining a cross-correlation of acoustic signals acquired from two microphones in an environment with low reverberation through Equation 2 below.

$$d_1 - d_2 = \frac{i}{f_s} \cdot v \quad \text{(Equation 2)}$$

(Here, d1 and d2 are the distances between each microphone and the sound source, i is the correlation peak index, fs is the sampling frequency, and v is the speed of the sound, respectively.)

When the result that satisfies the condition of Equation 2 is drawn as a graph, one of a straight line or a hyperbolic line appears, and the sound source position based on the difference in arrival time can be estimated through this.

However, the TDoA method has a disadvantage in that it is difficult to accurately calculate the difference in arrival time in an environment where there are many reverberations and noise, and a high sampling rate is required when recording a microphone. In addition, since the speed of sound varies depending on temperature, humidity, wind direction, etc., it is not easy to accurately calculate the speed of sound waves.

Figure 7:
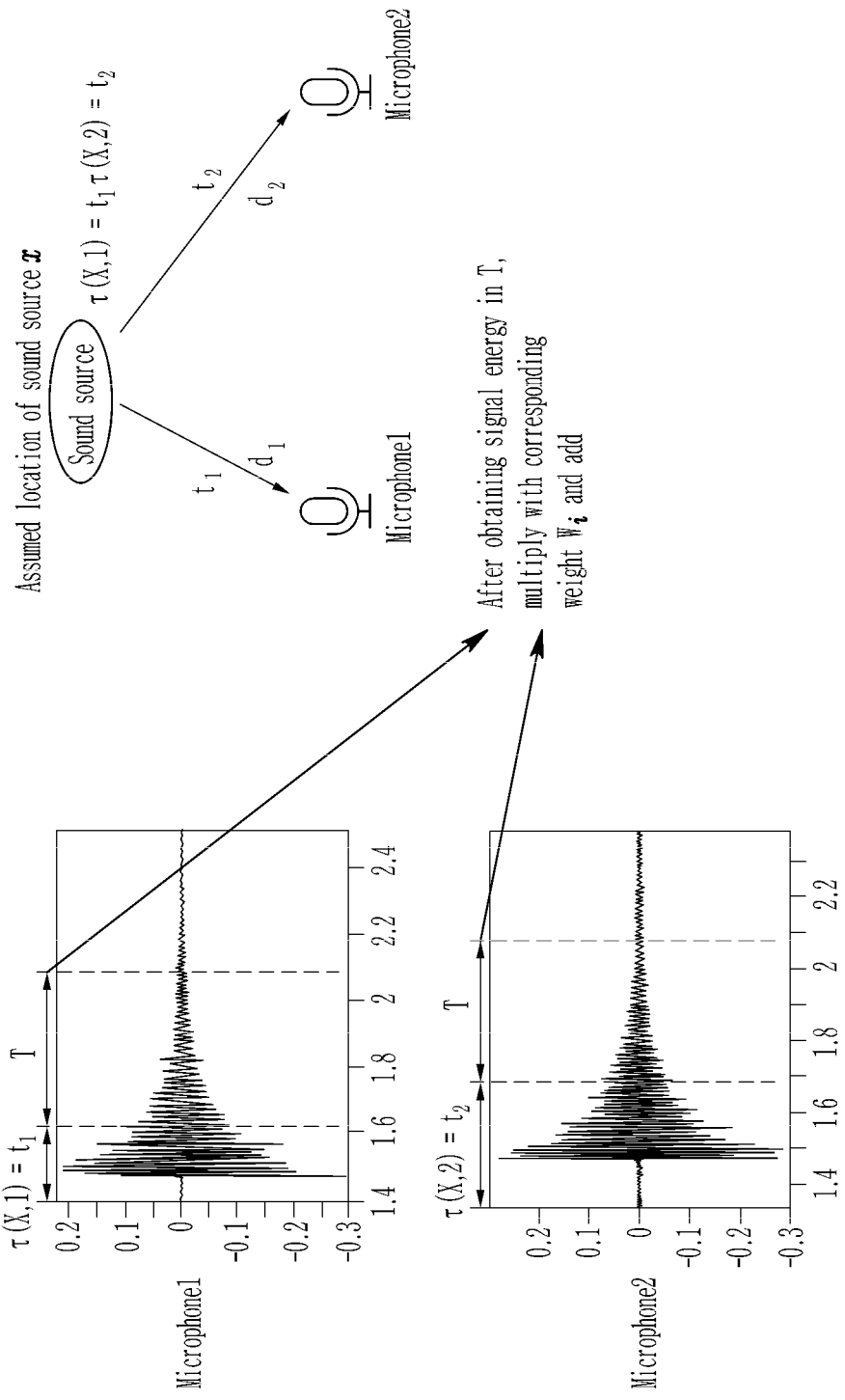
FIG. 7 illustrates an experiment for estimating a sound source position based on steering response power (SRP) in one form of the present disclosure and a result thereof.

Meanwhile, FIG. 7 illustrates an experiment for estimating a sound source position based on steering response power (SRP) according to an exemplary embodiment of the present disclosure and a result thereof.

Referring to FIG. 7, the SRP method shows a method of estimating the position of a sound source by considering a variable reflecting the difference in the reached sound power due to the distance between the target sound source and the two microphones arranged.

The sound source position estimation technique using SRP can reduce the effects of acoustic reverberation and noise through appropriate weight setting when converting an acoustic signal into a frequency domain. And, if expressed mathematically, it can be expressed as Equations 3 and 4 below.

$$P_n(x) = \int_0^T |\Sigma_{i=1}^M w_i m_i(t-\tau(x,i))|^2 dt \quad \text{(Equation 3)}$$

(Here, P(x) is the steering response power, wi is the weight of the i-th microphone, t(x,i) is the time delay mi(t) between the position x and the i-th microphone is the measurement signal of the i-th microphone, M Is the number of microphones and T is a time window.)

$$P_n'(x) = \Sigma_{k=1}^M \Sigma_{l=k+1}^M \int_{-\infty}^\infty W_k(\omega) W_l^*(\omega) M_k(\omega) M_l^*(\omega) e^{j\omega(\tau(x,l)-\tau(x,k))} d\omega \quad \text{(Equation 4)}$$

(Here, P'(x) denotes the steering response power in the frequency domain, W*(ω) denotes the weight in the frequency domain, and Mk(ω) denotes the measurement signal of the k-th microphone in the frequency domain.)

This SRP method has a disadvantage in that the sound source position estimation performance for a wideband signal is degraded and performance is degraded in an environment with many reverberations.

In the above description, the ILD, TDoA, and SRP methods are poor in performance in reverberation and noise environments, and thus the inspection reliability is poor to be applied to process line or vehicle inspection as it is.

Accordingly, an exemplary embodiment of the present disclosure provides an improved allophone inspection method by setting a sound source estimation algorithm in consideration of the installation environment of the allophone inspection device 100 and a weight according to the reliability of the microphone pair of the array microphone unit 110.

Figure 8:
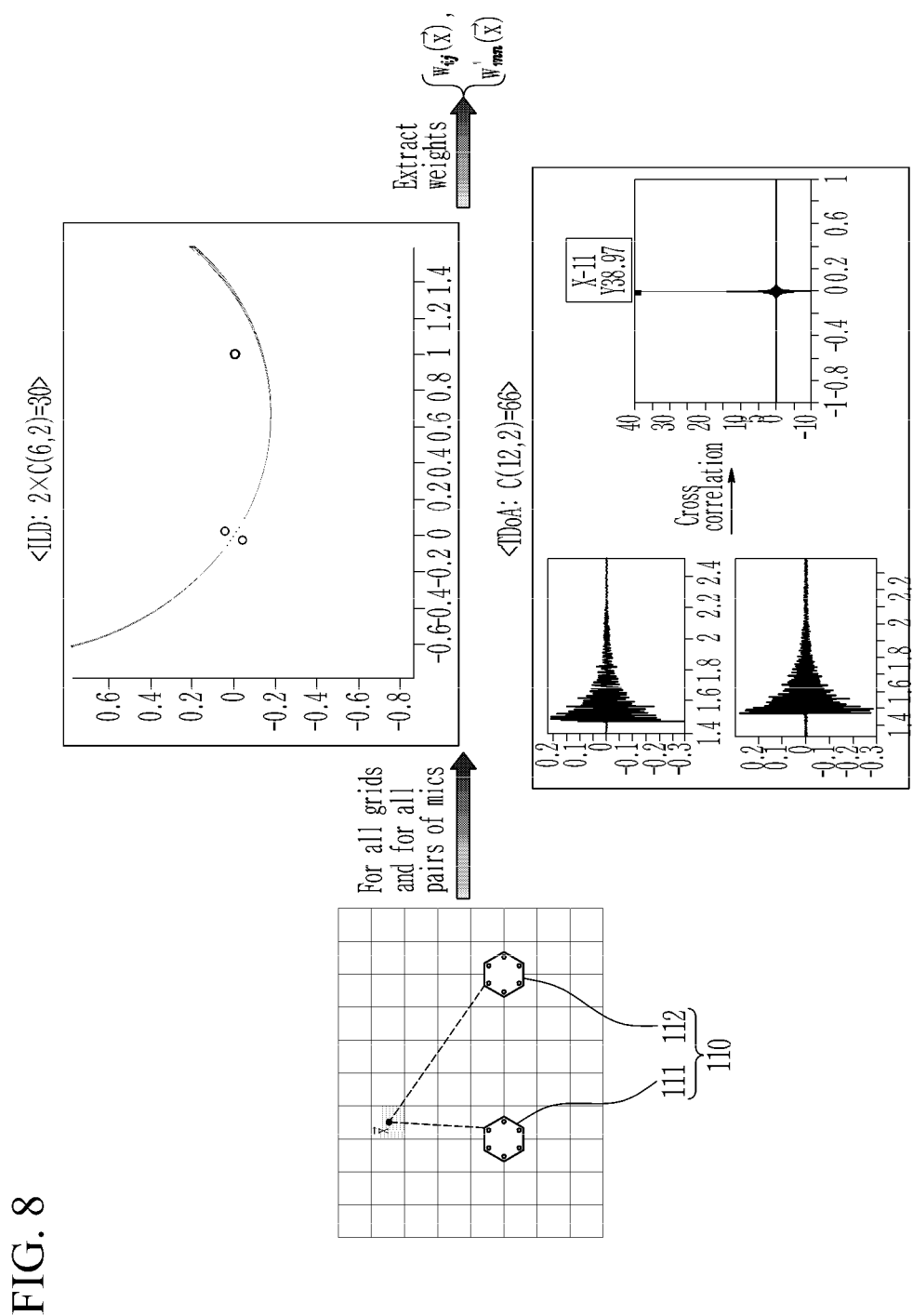
FIG. 8 is a conceptual diagram of setting weights to improve reliability of a sound source estimation algorithm in one form of the present disclosure.

FIG. 8 is a conceptual diagram of setting weights to improve reliability of a sound source estimation algorithm according to an exemplary embodiment of the present disclosure.

Referring to FIG. 8, the controller 170 of the allophone inspection device 100 sets weights according to the reliability of all microphone pairs using the characteristics of the acoustic signal received from the array microphone unit 110 and the database quantified by analysis of the acoustic signal through the experiment in the installed environment. For example, the weight according to the reliability may be set according to the characteristics of at least one of the peak value of the correlation, the index of the correlation peak, the power of the received sound signal, and the LOS (Line Of Sight) of the microphone and sound source.

The controller 170 sets weights for microphone pairs applicable to the first array microphone 111 and the second array microphone 112 in which six microphones are disposed, respectively, according to the characteristics of the sound signal. In other words, the weights for the number of microphone pairs in all cases are set according to the number of microphones respectively arranged in the first array microphone 111 and the second array microphone 112.

For example, in the case of a TDoA-based algorithm that requires time synchronization between microphones in which sound signals are received, 2×C(6,2)=30 applicable There is a mic pair. In addition, in the case of an ILD-based algorithm that does not require time synchronization, since there are C(12,2)=66 microphone pairs, a total of 30+66=96 weights can be set.

Here, a weight for each microphone pair and a reason for setting the weight according to an exemplary embodiment of the present disclosure will be described.

Since the array microphone unit 110 receives sound signals through different multipaths for each microphone, the most accurate sound source position may be estimated by performing an algorithm using a microphone pair that is least affected by reverberation. In the case of the weight setting, a corresponding installation position may be specified in advance, and then the result of which microphone pair estimates the most accurate sound source position for each position-based sound field region of the sound source through a measurement experiment may be set.

The reason for selecting the weight is that, when viewing the results of an experiment for estimating the position of a sound source using the array microphone unit 110, the results of the algorithm often collide with each other for each microphone pair. Another reason is that the range of error is different for each result of each algorithm, so the result of the algorithm cannot be unilaterally normalized and used. Therefore, the controller 170 is characterized by estimating a sound source position based on a minimum distance by selecting a weight according to the reliability of the result of the sound source estimation algorithm combining ILD and TDoA.

Therefore, the controller 170 may estimate the most probabilistic sound source position based on the minimum distance by setting weights reflecting different error ranges for each microphone pair. The weight may be set for each sound field area divided in the installed environment, or may be set for all possible microphone pairs for each specific sound source located in the sound field area.

As such, the sound source estimation algorithm considering the installation environment of the allophone inspection device 100 may estimate a more accurate sound source position in an actual environment than conventional sound source estimation methods by setting weights for each microphone pair. In particular, it is more effective when repetitive sound source positions must be estimated under the same environmental conditions, such as a process line or vehicle driving inspection.

The sound source estimation algorithm according to an embodiment of the present disclosure can be expressed as Equation 5 below, assuming that the signal received from microphone i is si(t) and '$\vec{x}_i$' is the position of microphone i.

$$P(\vec{x}) = \sum_{i<j} w_{ij}(\vec{x}) \left( \frac{\|\vec{x}-\vec{x}_i\|^2}{\|\vec{x}-\vec{x}_j\|^2} - \frac{\sum_0^T s_j^2(t)}{\sum_0^T s_i^2(t)} \right)^2 + \sum_{n<m} w'_{mn}(\vec{x})((\|\vec{x}-\vec{x}_m\| - \|\vec{x}-\vec{x}_n\|) - \tau_{mn}v)^2 \quad \text{(Equation 5)}$$

(Here, '$P(\vec{x})$' is the cost function, '$\vec{x}_{estimate}$=argmin $\{P(\vec{x})\}$', '$\tau_{mn}$' is the difference in arrival time between microphone m and microphone n, v is the speed of sound in the current environment, and '$w_{ij}(\vec{x})$' is the weight based on the difference in sound pressure intensity. '$w_{mn}$' denotes a weight based on an arrival time difference, respectively.)

In Equation 5, the first equation is obtained by multiplying the result of the sound pressure intensity difference (ILD) based algorithm for the microphone i,j by a weight.

In this case, the $$\frac{\|\vec{x}-\vec{x}_i\|^2}{\|\vec{x}-\vec{x}_j\|^2} - \frac{\sum_0^T s_j^2(t)}{\sum_0^T s_i^2(t)},$$

is a difference between the power ratio according to the distance difference and the energy ratio of the microphone acquired sound signal, and the value becomes smaller as the value is closer to the true value.

In addition, '$(\|\vec{x}-\vec{x}_m\|-\|\vec{x}-\vec{x}_n\|)-\tau_{mn}v$' is the difference between the Euclidean distance difference and the arrival time difference (TDoA) between each microphone at the point '$\vec{x}$' converted into a distance. The value becomes smaller as the point '$\vec{x}$' matches the actual sound source position.

In Equation 5, the second equation is obtained by multiplying the result of the TDoA algorithm for microphones m and n by a weight.

In this case, since time synchronization between microphones is required in order to apply the TDoA algorithm in the second equation, if the microphone m and the microphone n are not synchronized, the '$w_{mn}^i$' value may be set to 0.

Figure 9:
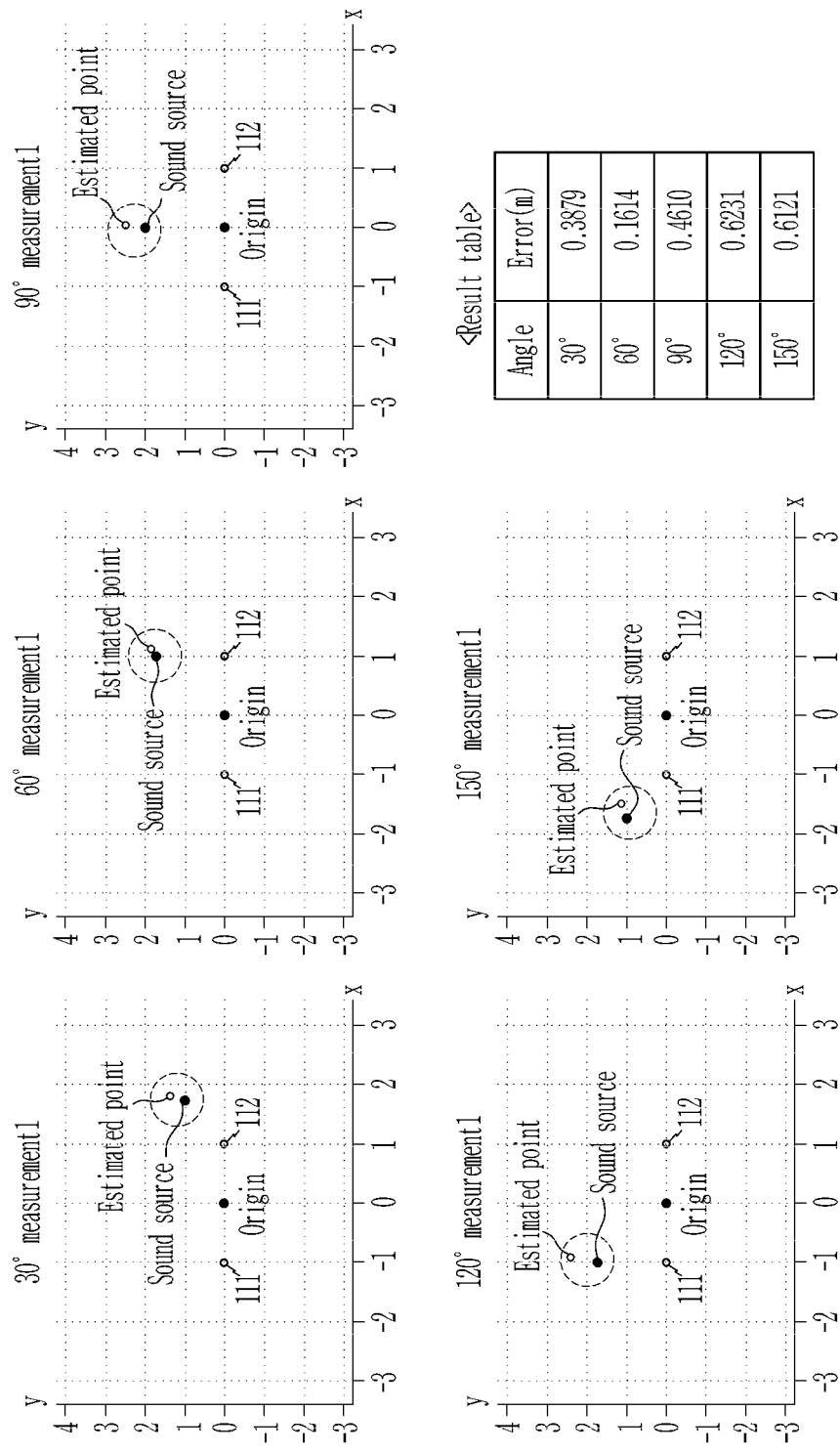
FIG. 9 shows a result of estimating the position of a sound source through an experiment in one form of the present disclosure.

Meanwhile, FIG. 9 shows a result of estimating the position of a sound source through an experiment according to an exemplary embodiment of the present disclosure.

Referring to FIG. 9, for each of the five graphs, the x-axis and y-axis position coordinate systems are set, and the position of the sound source is estimated by changing the position of the sound source (eg speaker) counterclockwise (30°, 60°, 90°, 120°, 150°) based on the x-axis of the origin (0, 0) where the array microphone unit 110 including the first array microphone 111 and the second array microphone 112 is installed.

The controller 170 may measure the distance error between the sound source position and the estimated point for each angle for one microphone pair in units of m, as shown in the result table. As described above, the controller 171 may estimate the position of a sound source that exists for each sound field region, and set the weight for each microphone pair to be high in an order in which the accuracy of the sound source estimation result for each sound field region is high.

The controller 170 may be implemented as one or more processors operating by programs set according to the sound source estimation algorithm, and may be programmed to perform each step of the sound source estimation method of FIG. 10 below.

Figure 10:
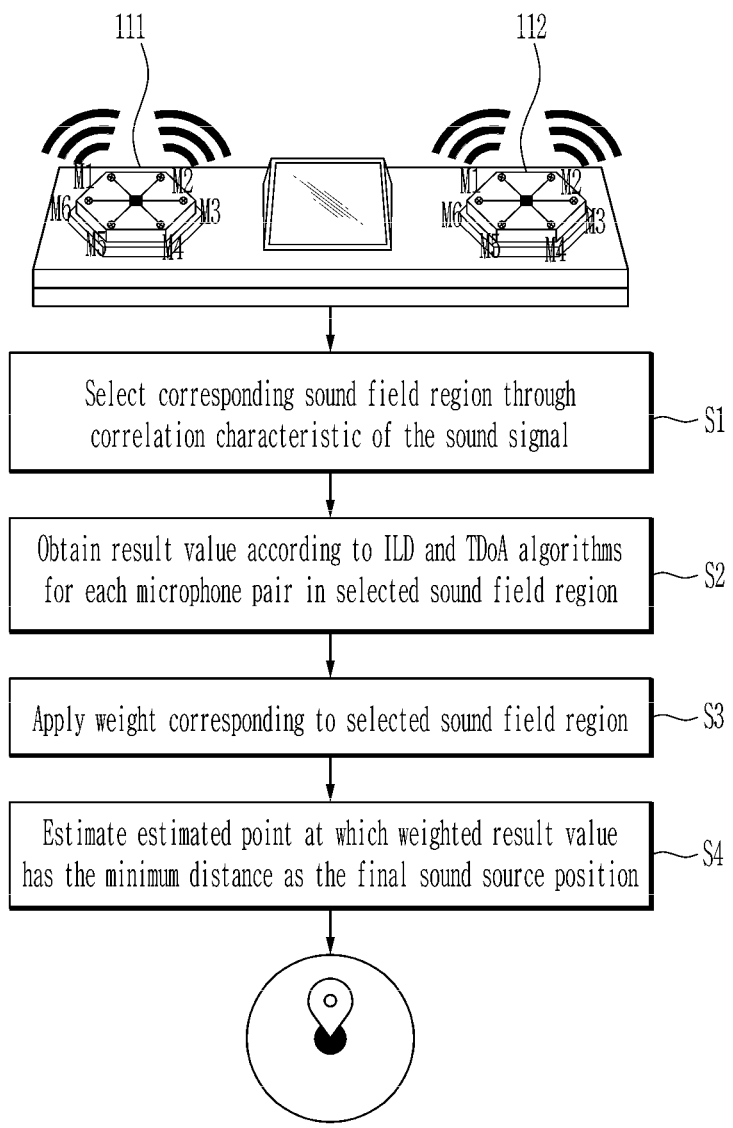
FIG. 10 is a flowchart schematically illustrating a sound source estimation method in one form of the present disclosure.

FIG. 10 is a flowchart schematically illustrating a sound source estimation method according to an exemplary embodiment of the present disclosure.

Referring to FIG. 10, the controller 170 selects a corresponding sound field region through a correlation characteristic of the sound signals received by the first array microphone 111 and the second array microphone 112 S1. For example, when six sound field regions are set in advance as shown in FIG. 4, the controller 170 may determine which microphone of the array disposed on the left and right first receives the sound signal, and select the sound field region in which the sound source exists based on the microphone pair.

The controller 170 obtains a result value including one or more estimated points and distances according to the ILD and TDoA algorithms for each microphone pair through the sound signal received in the selected sound field region S2. In this case, the controller 170 may obtain all estimated points and distances corresponding to the selected sound field region as a result value.

The controller 170 applies the weight corresponding to the selected sound field region to the result value obtained for each microphone pair according to the sound source estimation algorithm S3.

The controller 170 estimates the estimated point at which the weighted result value has the minimum distance as the final sound source position S4.

Meanwhile, allophone inspection method according to an exemplary embodiment of the present disclosure will be described with reference to FIG. 11 below based on the configuration of the allophone inspection device 100 described above. However, in the description of FIG. 11, the allophone inspection device 100 is used as the main body, and the driving inspection scenario of the vehicle is assumed to be described for better understanding.

Figure 11:
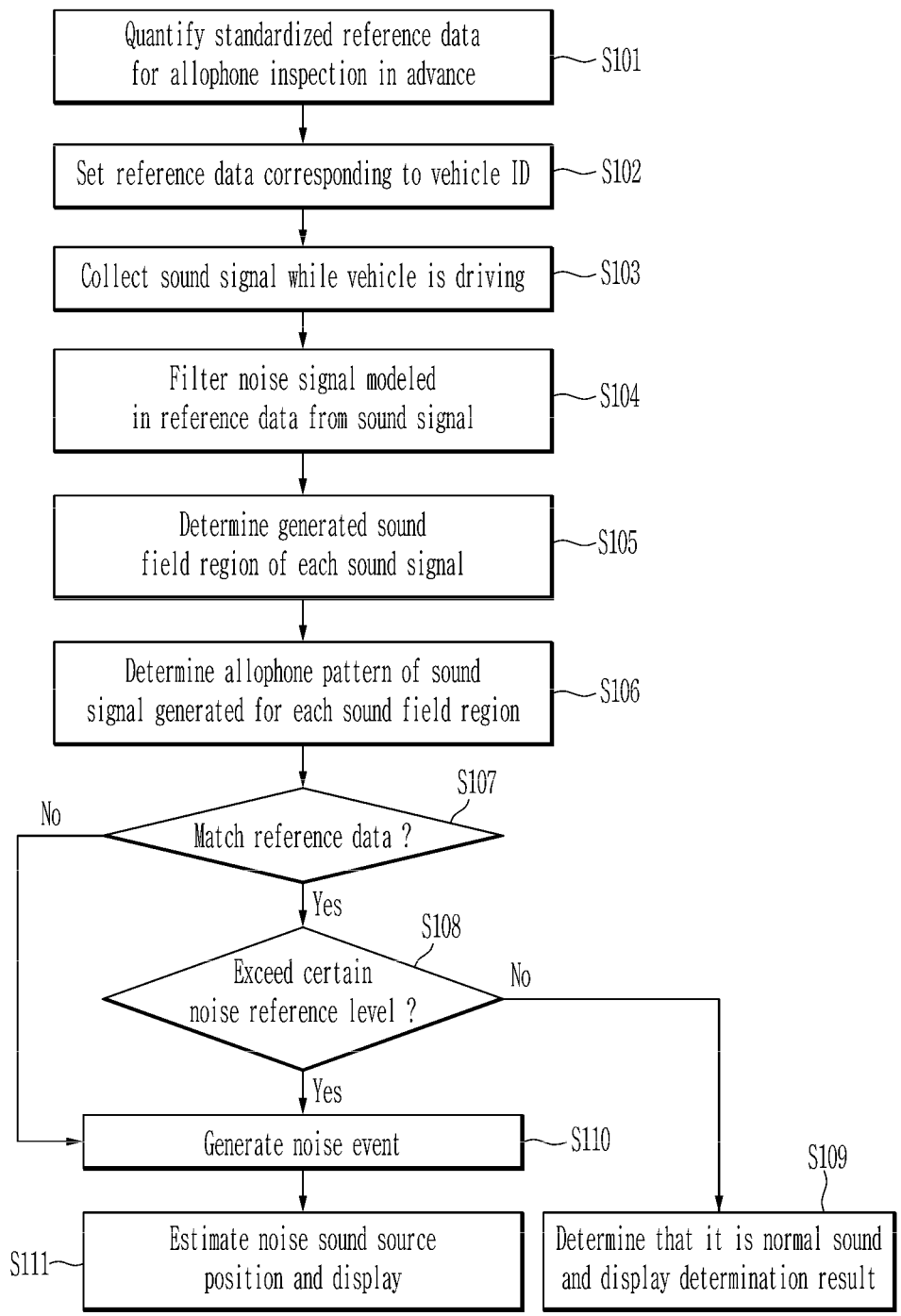
FIG. 11 is a flowchart schematically illustrating a vehicle driving inspection method using an allophone inspection device in one form of the present disclosure.

FIG. 11 is a flowchart schematically illustrating a vehicle driving inspection method using an allophone inspection device according to an exemplary embodiment of the present disclosure.

Referring to FIG. 11, the allophone inspection device 100 collects sound signals generated around each vehicle type and multi-option vehicle in advance for driving inspection of the vehicle, analyzes the allophone, and quantifies it through visualization and quantification to establish standardized reference data S101.

The allophone inspection device 100 sets reference data corresponding to the vehicle ID when the vehicle is mounted on the vehicle by an operator during driving inspection of the vehicle S102. At this time, the allophone inspection device 100 may read and load reference data matched with vehicle type and option (specification) information based on the vehicle ID obtained through connection with the wireless OBD of the installed vehicle from the memory 160.

The allophone inspection device 100 collects sound signals while the vehicle is driving through the first array microphone 111 and the second array microphone 112 arranged at regular intervals S103.

The allophone inspection device 100 classifies the received sound signal by microphone ID installed in the first array microphone 111 and the second array microphone 112, and filters the noise signal modeled in the reference data from the sound signal S104.

The allophone inspection device 100 analyzes each sound signal received for each microphone pair configured in the first array microphone 111 and the second array microphone 112 to determine a generated sound field region S105, and the sound field region A allophone pattern of the sound signal generated for each is determined S106.

If the allophone pattern of the sound signal matches the reference data set in the vehicle (S107; YES), and the power of the sound signal does not exceed a certain noise reference level (S108; YES), the allophone inspection device 100 determines that it is a normal sound and displays the determination result on the display unit 150 S109. In this case, the allophone inspection device 100 may match the normal sound determination result with the vehicle ID, store it in the memory 160 and transmit it to the MES, and then terminate the driving inspection.

On the other hand, if the allophone pattern of the sound signal does not match the reference data (S107; No), the allophone inspection device 100 may determine that it is an unspecified allophone not defined in the reference data and generate a noise event S110.

In addition, even if it is determined that the allophone pattern of the sound signal is a defined allophone (S107; Yes), if the power of the sound signal exceeds a certain noise reference level (S108; No), the allophone inspection device 100 may generate a noise event S110.

When the noise event occurs, the allophone inspection device 100 estimates the position of the noise source according to the sound source estimation algorithm and displays the estimate on the display unit 150, and the allophone inspection device 100 may match the noise event and the position of the noise source with the vehicle ID, and store it in the memory 160 and transmit it to the MES S111. In this case, the noise source position may be estimated using the sound source estimation method described with reference to FIG. 10, and through this, an abnormality in the machinery installed at the estimated sound source position may be diagnosed.

Thereafter, the allophone inspection device 100 is detached from the vehicle when the allophone inspection according to the above determination is completed.

Like this, according to an exemplary embodiment of the present disclosure, it is possible to prevent a human error dependent on an operator during a driving inspection of a conventional vehicle and improve measurement reliability by generating reference data suitable for the installation environment of the vehicle through an allophone inspection device in which a plurality of array microphones are modularly arranged and based on this, determining whether the received sound signal is a normal sound.

Further, it is possible to improve the sound source position estimation performance in an environment in which reverberation and noise exist by estimating the position of the sound source by selecting an appropriate weight for each microphone pair according to the installation environment of the allophone inspection device.

Further, the accuracy of sound source position estimation can be improved by obtaining the position of the sound source for each microphone pair through a sound source position estimation algorithm that combines the sound pressure intensity difference (ILD)-based technique and the arrival time difference (TDoA)-based technique and by estimating the position of the sound source based on the minimum distance.

In the above, the exemplary embodiments of the present disclosure have been described, but the present disclosure is not limited to the above-described embodiments, and various other changes are possible.

For example, in the exemplary embodiment of the present disclosure illustrated in FIG. 11, the description is made on the assumption of a driving inspection scenario of a vehicle, but the present disclosure is not limited thereto, and allophone inspection in a process line may be performed as shown in FIG. 3. Therefore, there is an advantage of implementing a smart factory that monitors the state of the process line through sound by constructing reference data in the process line, classifying a plurality of sound field regions, detecting the occurrence of noise events according to various facility operations, and estimating the position of the sound source.

The above-mentioned exemplary embodiments of the present disclosure are not embodied only by an apparatus and method. Alternatively, the above-mentioned exemplary embodiments may be embodied by a program performing functions, which correspond to the configuration of the exemplary embodiments of the present disclosure, or a recording medium on which the program is recorded. These embodiments can be easily devised from the description of the above-mentioned exemplary embodiments by those skilled in the art to which the present disclosure pertains.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. An allophone inspection device, comprising:
   an array microphone unit in which a plurality of array microphones are disposed at predetermined intervals; and
   a controller configured to:
      build reference data by quantifying allophone analyzed by collecting sound signals generated from surroundings based on a position where the array microphone unit is installed in advance;
      measure a surrounding sound signal through the array microphone unit to estimate whether or not noise is generated and a position of a sound source where the noise is generated based on the reference data;
      generate the reference data for each process line where allophone inspection is performed, for each vehicle type, and for each vehicle with multiple options;
      analyze the sound signal received in real time;
      generate a noise event when an undefined noise in the reference data is detected, or when a defined noise exceeds a predetermined noise reference level;
      select a weight according to a reliability of a result of a sound source estimation algorithm combining an interaural level difference (ILD) method and a time difference of arrival (TDoA) method; and
      estimate the sound source position where the noise event occurs based on a minimum distance of result values for each array microphone.

2. The allophone inspection device of claim 1, wherein the device further comprises:
   a sound collection unit configured to collect sound signal received from each array microphone when the array microphone unit is operated;
   a filter unit configured to:
      model and store a noise signal collected in the position or inspection environment in advance; and
      filter the noise signal from the received sound signal;
   a communication unit configured to communicate with MES (Manufacturing Execution System) or in-vehicle wireless OBD;
   a display unit configured to provide a user input menu (UI) for allophone inspection;
   a memory configured to store the reference data and result data according to the allophone inspection; and
   a main body in which at least one of the sound collection unit, the filter unit, the communication unit, the display unit, or the memory is mounted or built in.

3. The allophone inspection device of claim 2, wherein the communication unit is configured to:
acquire vehicle type and option information through the in-vehicle wireless OBD;
set the reference data matched to the vehicle type and option information; and
when the allophone inspection is completed, match a vehicle ID with inspection result data and transmit the matched vehicle ID to the MES.

4. The allophone inspection device of claim 3, wherein the sound collection unit is configured to:
classify the sound signal received from the signal lines connected to each array microphone of the plurality of array microphones by a microphone ID.

5. The allophone inspection device of claim 1, wherein the array microphone unit is modularized in a form in which a first array microphone and a second array microphone are installed in a straight line on a plane of the main body, wherein six array microphones including the first array microphone and the second array microphone are arranged in a hexagonal shape.

6. The allophone inspection device of claim 5, wherein the controller is configured to:
determine an allophone based on the sound signal received from the first array microphone and the second array microphone; and
estimate the position of the sound source existing on an half plane based on the straight line.

7. The allophone inspection device of claim 5, wherein the main body further includes:
a plurality of mounts disposed at regular intervals on both sides of a horizontal upper surface, to which each of the first array microphone and the second array microphone is coupled; and
a mounting portion detachably coupled to the vehicle on a lower surface.

8. The allophone inspection device of claim 7, wherein the mounting portion is provided with:
wings on both sides that are respectively inserted between a sunshield of a driver and a sunshield of a passenger, or
a suction plate attached to the vehicle's windshield.

9. The allophone inspection device of claim 1, wherein the controller is configured to:
generate a 3D sound map (MAP) divided into a plurality of sound field regions by analyzing sound signals generated according to an installation environment of a factory line or a vehicle in advance; and
quantify a normally generated allophone and the position of the sound source.

10. The allophone inspection device of claim 9, wherein the controller is configured to:
generate the reference data by digitizing a normal sound pattern and a sound source position generated from a sound source existing for each sound field region.

11. A method for inspecting a driving state of a vehicle by an allophone inspection device in which a plurality of array microphones are disposed at a predetermined interval, comprising:
a) analyzing allophone by collecting sound signals for each vehicle type and multiple option vehicles in advance, and generating reference data by quantifying through visualization and quantification;
b) collecting sound signals while the vehicle is driving through a first array microphone and a second array microphone arranged at regular intervals;
c) analyzing each sound signal received for the first array microphone and the second array microphone to determine allophone pattern of the sound signal for each sound field region; and
d) generating a noise event and estimating a position of a sound source where noise is generated when an undefined allophone pattern in the reference data is detected;
wherein estimating the position of the sound source includes:
d-1) selecting a corresponding sound field region based on a correlation characteristic between sound signals received by the first array microphone and the second array microphone;
d-2) obtaining a result value including one or more estimated points and distances according to a sound pressure intensity difference (ILD) and arrival time difference (TDoA) algorithm for each array microphone through the sound signal received in the selected sound field region;
d-3) applying a weight according to a reliability of a result of a sound source estimation algorithm combining the ILD and TDoA corresponding to the selected sound field region to the result value of each array microphone; and
d-4) estimating an estimated point having a minimum distance among the result value for each array microphone as a noise source position.

12. The method of claim 11, wherein the method further comprises:
between the a) step and b) step, setting the reference data corresponding to a vehicle ID obtained through a wireless OBD of the vehicle when the allophone inspection device is mounted on the vehicle.

13. The method of claim 11, wherein the b) step includes:
classifying a received sound signal according to each microphone ID installed in the first array microphone and the second array microphone; and
filtering a noise signal modeled in the reference data from the sound signal.

14. The method of claim 11, wherein:
in the d) step, the noise event occurs when the power of the sound signal exceeds a predetermined noise reference level when the allophone pattern of the sound signal is determined to be a defined allophone.

15. The method of claim 11, wherein the sound source estimation algorithm is configured to:
calculate the estimated point for each array microphone using the following Equation when the signal received from microphone i is called si(t) and $\vec{x}_i$ is the position of microphone, $$P(\vec{x}) = \sum_{i<j} w_{ij}(\vec{x}) \left( \frac{\|\vec{x} - \vec{x}_i\|^2}{\|\vec{x} - \vec{x}_j\|^2} - \frac{\sum_0^T s_j^2(t)}{\sum_0^T s_i^2(t)} \right)^2 +$$

$$\sum_{n<m} w'_{mn}(\vec{x})((\|\vec{x} - \vec{x}_m\| - \|\vec{x} - \vec{x}_n\|) - \tau_{mn} v)^2$$

where $P(\vec{x})$ is cost function, $\hat{x}_{estimate} = \mathrm{argmin}\{P(\vec{x}_i)\}$, $\tau_{mn}$ is difference in arrival time between microphone m and microphone n, v is the speed of sound in the current environment, $w_{ij}(\vec{x})$ is weight value based on sound pressure difference, and, $w'_{mn}$ is weight value based on difference in arrival time.

16. The method of claim 11, wherein the method further comprises:
after the d) step, displaying the estimated noise source position on a display unit; and
matching the position of the noise event and the noise source with the vehicle ID, storing it in a memory, and transmitting it to a Manufacturing Execution System (MES).

\* \* \* \* \*